(12) United States Patent
Khzouz

(10) Patent No.: US 12,244,126 B2
(45) Date of Patent: Mar. 4, 2025

(54) SYSTEMS AND METHODS FOR TRANSFERRING HEAT GENERATED IN AN ELECTRICAL ENCLOSURE

(71) Applicant: ABB Schweiz AG, Baden (CH)

(72) Inventor: Erik Ryan Khzouz, Plainville, CT (US)

(73) Assignee: ABB Schweiz AG, Baden (CH)

( * ) Notice: Subject to any disclaimer, the term of this patent is extended or adjusted under 35 U.S.C. 154(b) by 246 days.

(21) Appl. No.: 17/726,969

(22) Filed: Apr. 22, 2022

(65) Prior Publication Data

US 2023/0344203 A1    Oct. 26, 2023

(51) Int. Cl.
*H02B 1/56* (2006.01)
*H02B 1/20* (2006.01)

(52) U.S. Cl.
CPC .............. *H02B 1/565* (2013.01); *H02B 1/20* (2013.01)

(58) Field of Classification Search
None
See application file for complete search history.

(56) References Cited

U.S. PATENT DOCUMENTS

| | | | | |
|---|---|---|---|---|
| 3,858,092 A | * | 12/1974 | Olashaw | H02B 1/21 361/627 |
| 4,033,660 A | * | 7/1977 | Ericson | H02B 11/04 439/262 |
| 4,051,335 A | * | 9/1977 | Ericson | H02B 11/133 361/609 |
| 5,343,355 A | * | 8/1994 | Ishikawa | H02B 11/24 361/617 |
| 8,792,226 B2 | | 7/2014 | Dhar et al. | |
| 8,809,705 B2 | * | 8/2014 | Serrano | G06F 16/26 200/50.21 |
| 9,653,896 B2 | | 5/2017 | Lafond et al. | |
| 10,164,387 B2 | * | 12/2018 | Baillargeon | H02B 1/052 |
| 10,292,310 B2 | * | 5/2019 | Maloney | F28F 21/084 |
| 11,158,998 B1 | * | 10/2021 | Fonseca | H02B 1/56 |
| 2007/0137991 A1 | * | 6/2007 | Kashyap | H02B 11/24 200/50.22 |
| 2013/0279083 A1 | * | 10/2013 | Faber | H02B 11/04 361/618 |
| 2015/0064949 A1 | * | 3/2015 | Rahn | H02B 1/20 439/212 |
| 2015/0371790 A1 | * | 12/2015 | Sippel | H01H 71/082 29/874 |

(Continued)

*Primary Examiner* — Courtney L Smith
(74) *Attorney, Agent, or Firm* — McCarter & English, LLP; Michael M. Gnibus

(57) ABSTRACT

A system for transferring heat generated in an electrical enclosure includes run-in buses, a thermally conductive plate, and at least one contact assembly secured to the plate. Each pair of adjacent run-in buses is separated by a space. The plate has at least one opening extending therethrough, and the plate receives the run-in buses through the at least one opening. The at least one contact assembly has spaced apart fingers that partially cover the at least one opening of the plate, and adjacent fingers define a slot. Each of the fingers is located in a space between adjacent run-in buses, and each of the run-in buses is located in a slot when the fingers are located in the spaces between adjacent run-in buses. The run-in buses and contact assembly fingers are oriented in an interleaved pattern.

20 Claims, 8 Drawing Sheets

(56) References Cited

U.S. PATENT DOCUMENTS

| | | | |
|---|---|---|---|
| 2015/0372460 A1* | 12/2015 | Faber | H01B 17/42 |
| | | | 361/673 |
| 2023/0318268 A1* | 10/2023 | McBride | H02B 1/21 |
| | | | 361/605 |

* cited by examiner

SYSTEMS AND METHODS FOR TRANSFERRING HEAT GENERATED IN AN ELECTRICAL ENCLOSURE

BACKGROUND

The field of the disclosure relates generally to electrical enclosures and, more particularly, to systems and methods for transferring heat generated in an electrical enclosure.

Switchgear is an electrical enclosure or cabinet that houses electric switching and interrupting devices, such as circuit breakers, fuses, and associated control equipment, along with buses, power cables, and interconnections for the distribution of electric power. Switchgear is arranged into a series of sections that each house different components. For example, switchgear may include a cable section and a circuit breaker section. The cable section and the circuit breaker section may be located on opposite sides of a busbar assembly. The circuit breaker section may include compartments that house a circuit breaker in electrical connection with the busbar assembly and/or compartments that house auxiliary control equipment. Each circuit breaker may be electrically connected to a vertical busbar of the busbar assembly by a series of horizontal run-in buses that carry electrical current between the vertical busbar and the circuit breaker.

Switchgear systems sales and marketing is quite competitive. Two switchgear technical attributes that may serve as predictors of technical acceptance in the marketplace and associated commercial success are increased switchgear power density and a reduced switchgear system footprint. Power density measures the amount of power provided by switchgear breakers, and may be defined by the number of breakers included in switchgear, or by the total amperage of the breakers per unit volume of the switchgear cabinet or enclosure. Switchgear is a heat-rated product and must be thermally tested and achieve passing results to be certified for operation. As a result, it is difficult to increase switchgear power density because increasing switchgear power density similarly increases the heat generated by current flowing through electrical components within switchgear. The additional heat increases the temperature of the components. As the volume of the switchgear enclosure is reduced, the volume of ambient air within the enclosure is similarly reduced. As a result, it is a challenge to dissipate heat generated by the circuit breaker components using relatively cool ambient airflow. Existing techniques attempt to dissipate heat through selective ventilation of the enclosure, or by increasing the amount of copper that is used to form the switchgear buses. In general, ventilation is limited by the amount of natural airflow that can be generated within switchgear cabinet. Additionally, adding copper typically may consume more space within the fixed enclosure volume, further reducing available volume for ambient air, and use of copper is a costly solution given the fluctuations in global commodities. Accordingly, improvements in switchgear that supports a reduced enclosure volume and effectively dissipates system heat at a greater rate than existing techniques are desired.

BRIEF DESCRIPTION

In one aspect, a system for transferring heat generated in an electrical enclosure housing a busbar assembly and a circuit breaker includes run-in buses, a thermally conductive plate, and at least one contact assembly secured to the plate. The run-in buses are configured to conduct an electrical current between the busbar assembly and the circuit breaker. Each pair of adjacent run-in buses is separated by a space. The thermally conductive plate has at least one opening extending therethrough, and the plate receives the run-in buses through the at least one opening. The at least one contact assembly has spaced apart fingers that partially cover the at least one opening of the plate, and adjacent fingers define a slot. Each of the fingers is located in a space between adjacent run-in buses, and each of the run-in buses is located in a slot when the fingers are located in the spaces between adjacent run-in buses. The run-in buses and contact assembly fingers are oriented in an interleaved pattern.

In another aspect, an electrical enclosure has a first end and a second end, and opposing sides extending between the first end and the second end. The electrical enclosure includes an interior wall that joins the sides of the electrical enclosure and extends between the first end and the second end. The interior wall includes at least one thermally conductive plate that has at least one opening extending therethrough. The electrical enclosure also includes at least one contact assembly secured to the thermally conductive plate. The at least one contact assembly has spaced apart fingers that partially cover the at least one opening of the plate, and adjacent fingers define a slot. The electrical enclosure also includes a busbar assembly positioned between the first end and the interior wall and a circuit breaker positioned between the second end and the interior wall. The electrical enclosure also includes run-in buses that extend between the busbar assembly and the circuit breaker, and extend through the at least one opening of the thermally conductive plate. Each pair of adjacent run-in buses is separated by a space. Each of the run-in buses is located in a slot of the at least one contact assembly, and each of the spaced apart fingers of the at least one contact assembly is located in a space between adjacent run-in buses. The run-in buses and contact assembly fingers are oriented in an interleaved pattern.

In another aspect, a method for transferring heat generated in an electrical enclosure includes guiding run-in buses that extend between a busbar assembly and a circuit breaker of the electrical enclosure through a thermally conductive plate. The thermally conductive plate has a first end secured to a metal side post that extends along a periphery of the electrical enclosure. The thermally conductive plate is in contact with each of the run-in buses. The method also includes generating heat in the run-in buses by conducting a current through the run-in buses and transferring heat generated in the run-in buses toward the metal side post using the thermally conductive plate.

DETAILED DESCRIPTION

Figure 1:
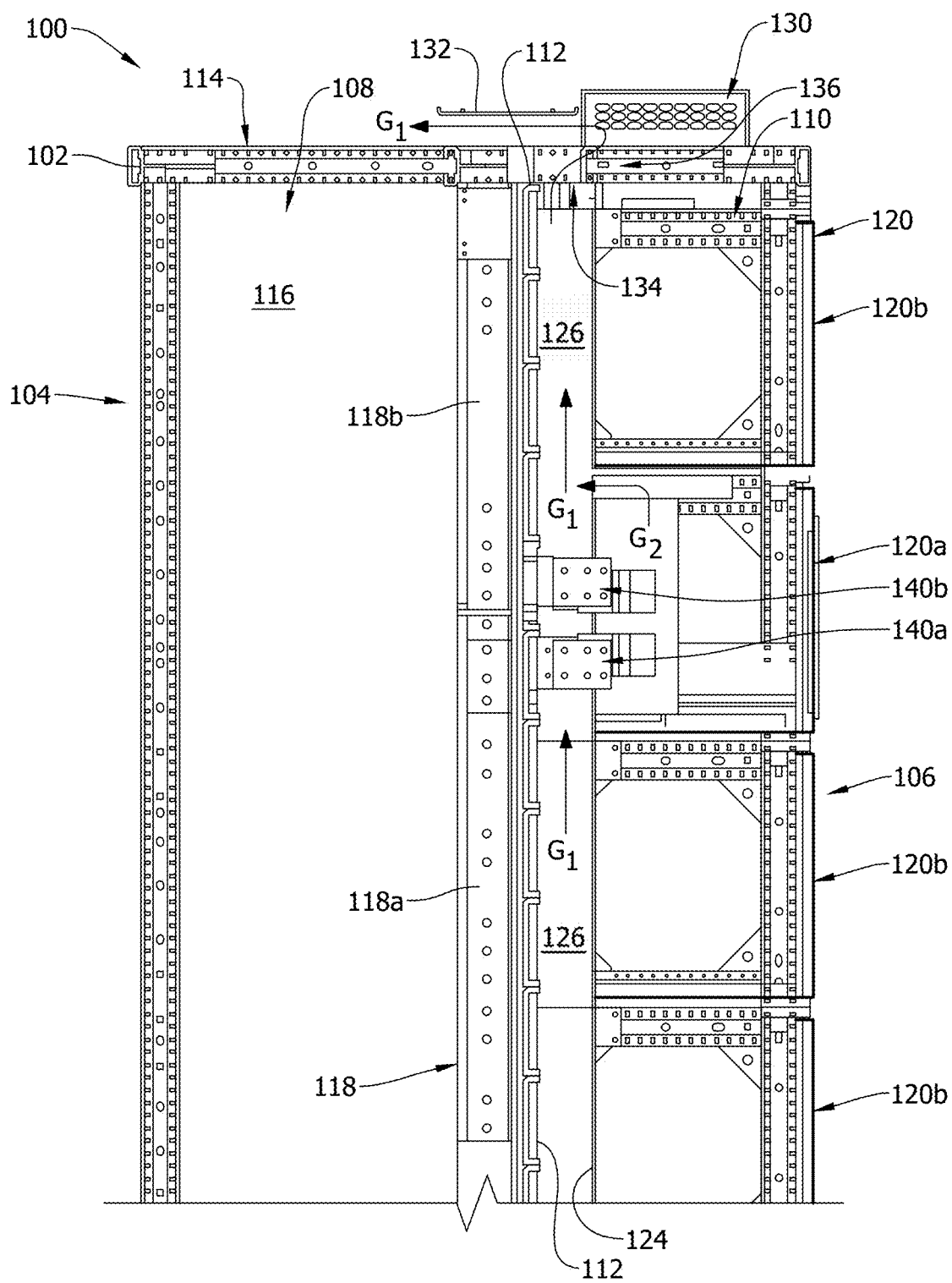
FIG. 1 is a schematic, cross-sectional side view of a portion of an exemplary electrical enclosure.

Referring to FIG. 1, a schematic, cross-sectional side view of a portion of an exemplary electrical enclosure 100 is shown. In the exemplary embodiment, electrical enclosure 100 is a low-voltage switchgear 100. As used herein, the term "switchgear" refers to an electrical enclosure that includes electrical disconnect switches, fuses or circuit breakers used to control, protect, and isolate electrical equipment. The term "low-voltage" refers to switchgear operating at voltages lower than 2 kV. Switchgear 100 includes a cabinet body 102 extending between a first end 104 and a second end 106 and defining an interior of switchgear 100. The interior includes a first interior portion 108, a second interior portion 110, and an interior wall 112. First edge 114 has a rectangular configuration and is oriented horizontally and extends between first end 104 and second end 106. Interior wall 112 extends vertically and joins first edge 114 of cabinet body 102, and a second edge (not shown) of cabinet body 102 opposite first edge 114. Like first edge 114, the second edge has a substantially rectangular configuration. In the exemplary orientation shown in FIG. 1, first edge 114 defines a top of cabinet body 102 and the second edge defines a base of cabinet body 102. However, in other embodiments, switchgear 100 may have an alternative orientation, and is not intended to be limited to the orientation shown in FIG. 1. Interior wall 112 separates first interior portion 108 from second interior portion 110. The first interior portion 108 is defined by interior wall 112 and first end 104, and the first and second edges. The second interior portion 110, is defined by interior wall 112, second end 106 and the first and second edges.

First interior portion 108 includes a generally open portion 116 that houses cables and other ancillary components of switchgear 100, and a vertically extending busbar assembly 118 adjacent open portion 116. The busbar assembly 118 carries an electrical current supplied from an external electrical source (not shown). Busbar assembly 118 may include a first busbar 118a and a second busbar 118b for each phase of a circuit breaker 122 housed in second interior portion 110, described in more detail below. In other embodiments, busbar assembly 118 may include more or fewer busbars for each phase. Each of the first and second busbars 118a,b supplies electrical current to and/or receives current from circuit breaker 122, as described in more detail below. In the exemplary embodiment, busbar assembly 118 is located within first interior portion 108 adjacent interior wall 112. The location of busbar assembly 118 in first interior portion 108 are not intended to be limited to the exemplary embodiment, and may vary to enable switchgear 100 to function for its desired application. Moreover, in some embodiments, busbar assembly 118 may be isolated from open portion 116 by a partition (not shown) spaced from interior wall 112 and located in the first interior portion 108. In other embodiments, busbar assembly 118 may not be isolated in first interior portion 108 from other switchgear components located in open portion 116. The busbar assembly 118 may be co-located in open portion 116 with other switchgear components located in the open portion 116.

Second interior portion 110 includes a plurality of compartments 120 vertically spaced and arranged along second end 106 of cabinet body 102 between first edge 114 and the second edge (not shown) opposite first edge 114. In the exemplary embodiment, each compartment 120 may be a circuit breaker compartment 120a that houses a circuit breaker (e.g., circuit breaker 122 shown in FIG. 2) or an auxiliary compartment 120b that houses electrical components (not shown), such as controls, relays, communication devices, indicators, and the like. Any number of circuit breaker compartments 120a and/or auxiliary compartments 120b may be included in second interior portion 110 to enable switchgear 100 to function for its desired application.

Second interior portion 110 also includes a vent wall 124 spaced from interior wall 112. Vent wall 124 at least partially isolates an interior of each compartment 120 from an exhaust channel 126 extending through second interior portion 110 between vent wall 124 and interior wall 112. A first metal side post 128a and a second metal side post 128b (shown in FIG. 3) extend adjacent to exhaust channel 126 and along opposite sides of cabinet body 102 between first edge 114 and the second edge. Interior wall 112 extends between, and joins, first and second metal side posts 128a,b. Exhaust channel 126 is defined by vent wall 124, interior wall 112, and first and second metal side posts 128a,b.

Cabinet body 102 may also include a plenum 130 positioned at first edge 114 proximate first interior portion 110. Plenum 130 includes a vent duct 132 defining an opening exposed outwardly of the cabinet body 102. Plenum 130 also includes an inlet 134 fluidly connected to exhaust channel 126, and an interior passage 136 extending through plenum 130 from inlet 134 to vent duct 132. Together, exhaust channel 126 and plenum 130 enable a flow of cooling air, and/or gases and other undesired emissions formed in second interior portion 110, to flow through exhaust channel 126 and out from cabinet body 102 as gas stream $G_1$. In some embodiments, an interior portion 138 (shown in FIG. 2) of circuit breaker compartment 120a may be fluidly connected to exhaust channel 126 so that gases $G_2$ that form during operation of circuit breaker 122 flow out from cabinet body 102 and are entrained in gas stream $G_1$. Cooling air may be provided and directed through exhaust channel 126 by a fan module (not shown) included within or adjacent to first interior portion 110. In some embodiments, the fan module may be an integral component of one or more of the compartments 120. In other embodiments, the fan module may be a separate component included within or adjacent to first interior portion. Plenum 130 may also include a second inlet (not shown) that is fluidly connected to first interior portion 108 to enable gases and other emissions formed in first interior portion 108 to flow through plenum 130 (e.g., through interior passage 136) and outward from cabinet body 102 through the outwardly exposed opening of vent duct 132.

Figure 2:
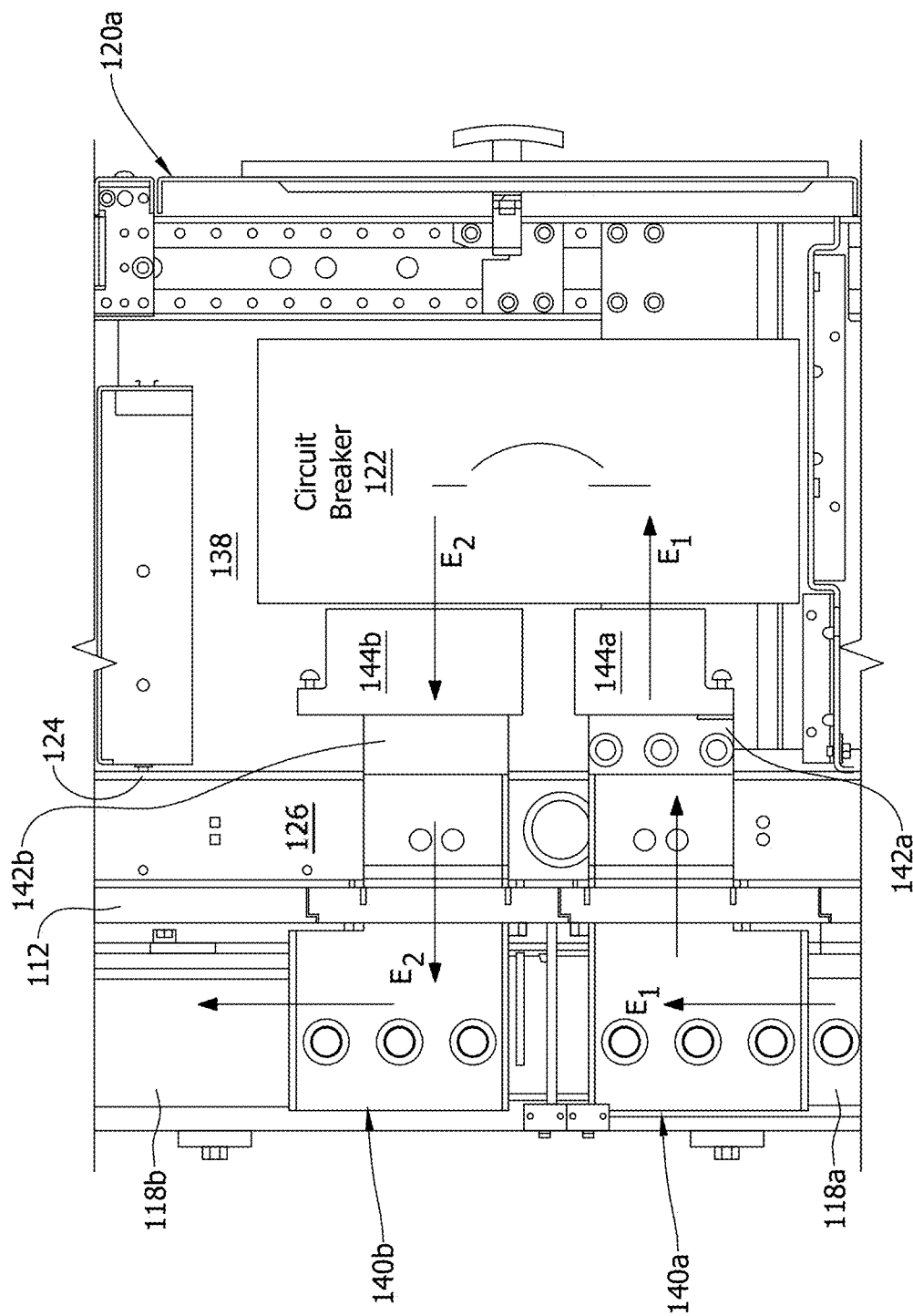
FIG. 2 is a magnified view of the portion of the electrical enclosure in FIG. 1.

Referring to FIG. 2, a magnified view of a portion of the circuit breaker compartment 120a and a portion of the first and second busbars 118a,b of switchgear 100 (shown in FIG. 1) is shown. As shown in FIG. 2, circuit breaker compartment 120a houses circuit breaker 122 in an interior portion 138 of compartment 120a. Circuit breaker 122 is electrically connected to busbar assembly 118 by sets of spaced run-in buses 140a and 140b. In the exemplary embodiment, circuit breaker 122 is a three-phase circuit breaker 122. For each phase of circuit breaker 122, a pair of disconnects 144a and 144b are provided. For each phase, a first set of run-in buses 140a connect at one end to a first busbar 118a and connect at an opposite end to conductive stab tips 142a inserted into disconnect 144a of the respective phase. For each phase, a second set of run-in buses 140b connect at one end to a second busbar 118b and connect at another end to conductive stab tips 142b inserted into disconnect 144b of the respective phase. Each of the run-in buses 140a,b extends between the respective busbar 118a,b and the circuit breaker compartment 120a through interior wall 112, exhaust channel 126, and vent wall 124. In each set of run-in buses 140a,b, pairs of adjacent run-in buses 140a and pairs of adjacent run-in buses 140b are separated by a space.

Figure 3:
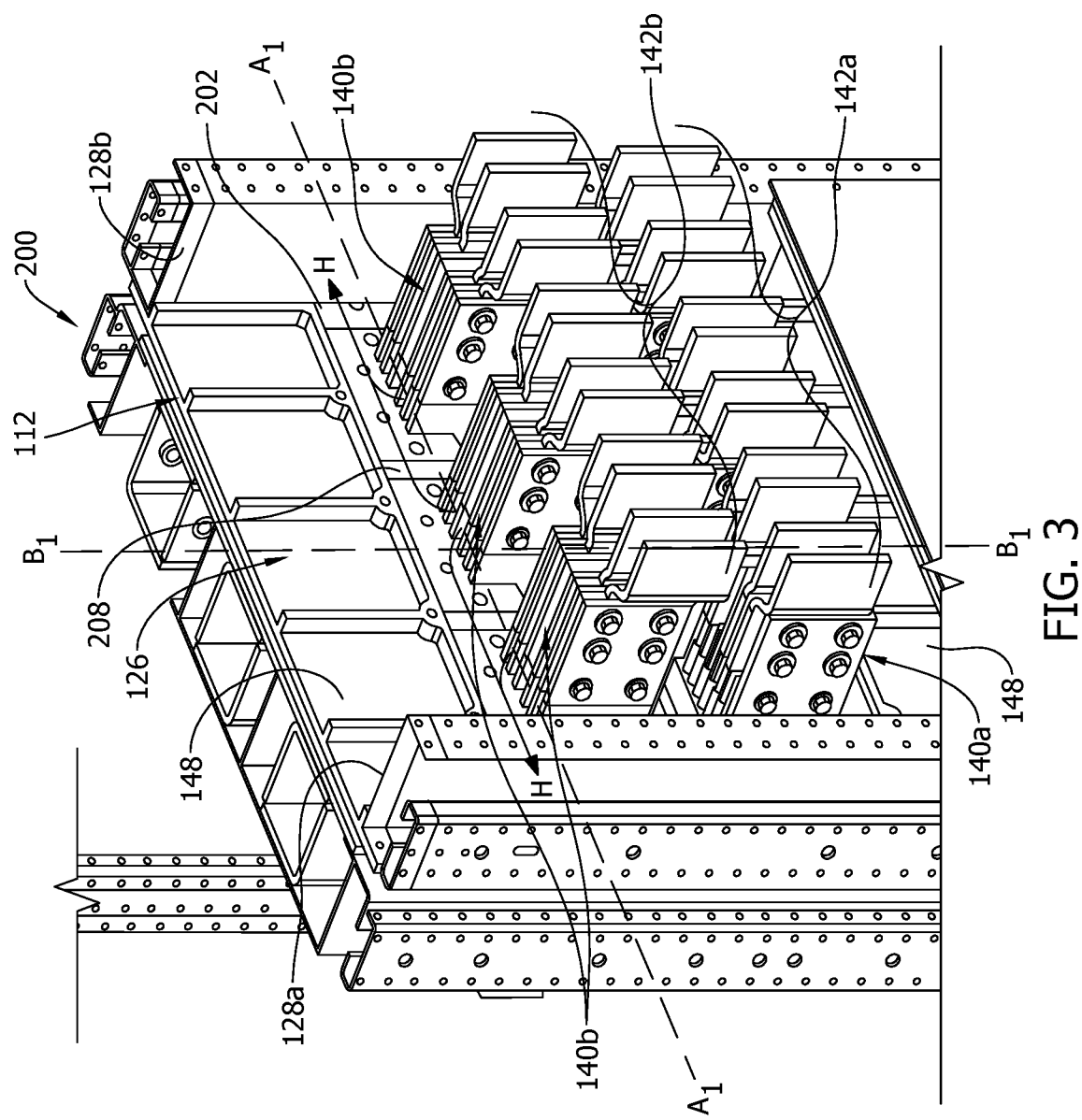
FIG. 3 is an isolated perspective view of a portion of the electrical enclosure shown in FIG. 1 showing a configuration of run-in buses housed in the electrical enclosure.
Figure 4:
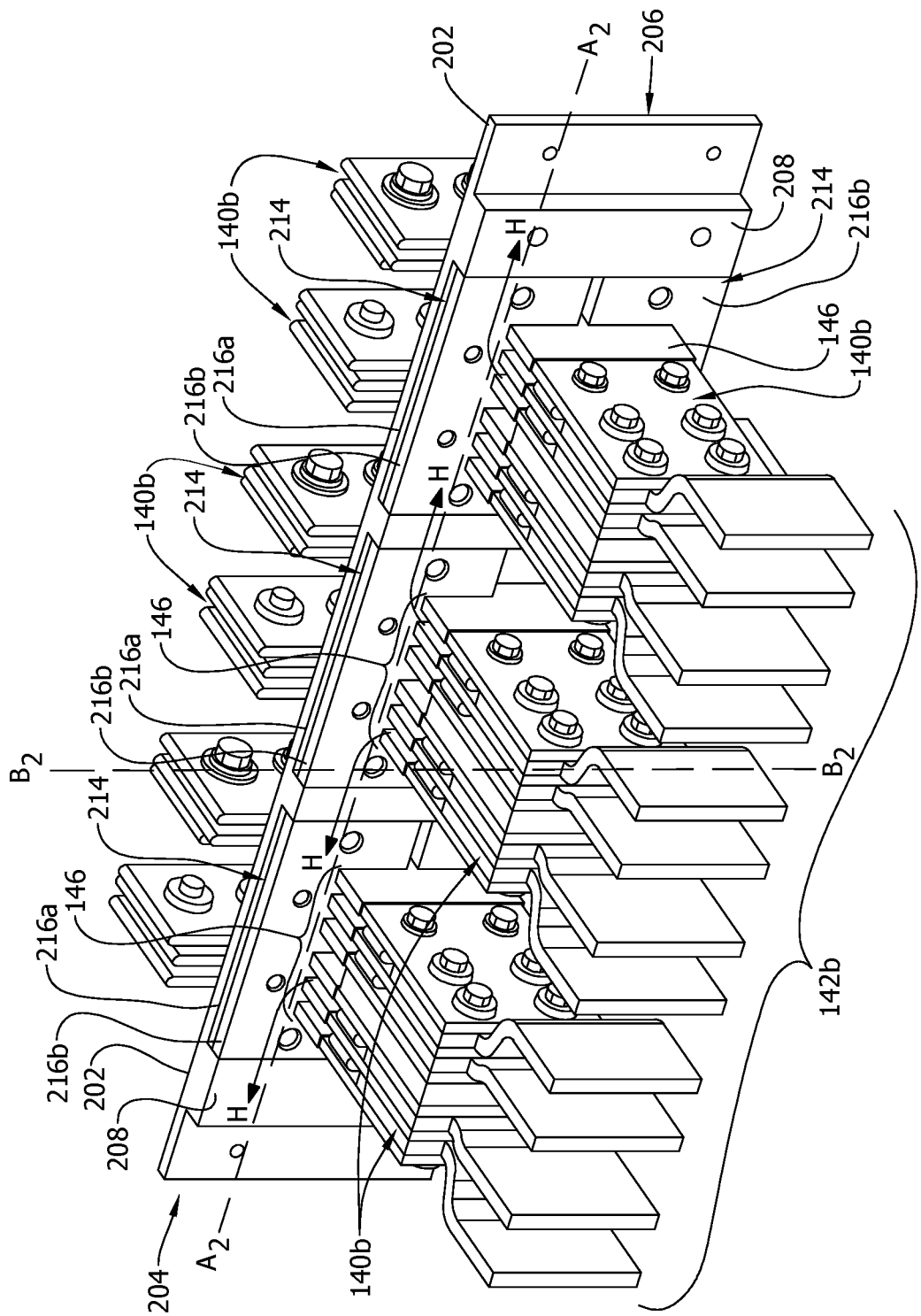
FIG. 4 is an isolated perspective view of run-in buses shown in FIG. 3 attached to an exemplary thermally conductive plate for transferring heat generated in the electrical enclosure during operation.

With additional reference to FIGS. 3 and 4, the three sets of run-buses 140a corresponding to each phase of circuit breaker 122 are aligned along an axis $A_1$ and are located between the first and second side posts 128a and 128b. Like run-in buses 140a, run-in buses 140b are located between side posts 128a, 128b and are aligned along axis A1. The run-in buses 140a and the run-in buses 140b extend through interior wall 112 and exhaust channel 126. Each set of spaced run-in buses 140a aligns with a set of spaced run-in buses 140b along an axis $B_1$ that extends substantially perpendicular to axis $A_1$ between the first edge 114 and the second edge of switchgear 100. The set of run-in buses 140a and set of run-in buses 140b that are aligned along axis $B_1$ correspond to the same phase of circuit breaker 122. In the exemplary embodiment, each of the run-in buses 140a and 140b is comprised of a L-shaped plate body, and the bodies of all of the run-in buses 140a and 140b are of substantially the same size and shape and are arranged in substantially parallel orientation. In other embodiments, the run-in buses 140a and 140b may have different sizes, shapes and/or orientations that enable the run-in buses 140a and 140b to function as described herein.

During operation, current $E_1$ is supplied from busbar 118a and flows through run-in buses 140a and through stab tips 142a to circuit breaker 122. Current $E_2$ flows from circuit breaker 122 through stab tips 142b and through run-in buses 140b to busbar 118b. Collectively, circuit breaker 122, run-in buses 140a,b and stab tips 142a,b define an electrical circuit between busbars 118a and 118b and, as such, can be used to interrupt current flow between busbar 118a and 118b. Circuit breaker 122 is rated to operate at a specified amperage, which determines an amount of current $E_1$ and $E_2$ flowing between busbar 118a and busbar 118b for each respective phase that can be effectively handled by circuit breaker 122 during normal operation. As the amperage rating of circuit breaker 122 increases, circuit breaker 122 can effectively operate with a greater amount of current $E_1$ and $E_2$. Increasing the amount of current $E_1$ and $E_2$ flowing to and from circuit breaker 122 heightens heat generation in the circuit components (e.g., busbars 118a,b, run-in buses 140a,b, stab tips 142a,b, and/or disconnect points 144a,b). In general, in order for switchgear 100 to be considered properly heat rated for operation, the heat generated in each of the circuit components must not cause a temperature of the component to exceed a predetermined temperature rise limit, which may be governed or otherwise determined by regulatory standards. A particular challenge in designing a properly heat rated switchgear 100 is maintaining the temperature of the run-in buses 140a,b within the predetermined temperature rise limit. In some examples, the predetermined temperature rise limit for run-in buses 140a,b may be from about 55° C. (131° F.) to about 95° C. (203° F.), or from about 65° C. (149° F.) to about 85° C. (185° F.). In these examples, the heat generated in the run-in buses 140a,b may cause a temperature of the run-in buses 140a,b to reach or exceed from about 60° C. (140° F.) to about 100° C. (212° F.), or from about 70° C. (158° F.) to about 90° C. (194° F.). While extending run-in buses 140a,b through exhaust channel 126 may serve to mitigate temperature increases in run-in buses 140a,b by exposing the run-in buses 140a,b to relatively cool air flowing through exhaust channel 126, these measures may not satisfactorily transfer a sufficient amount of heat from the run-in buses 140a,b to keep the temperatures of the run-in buses 140a,b within the predetermined limit.

Accordingly, referring now to FIGS. 3-8, an exemplary system 200 for transferring heat generated in switchgear 100 is shown. System 200 includes thermally conductive plates 202 that, when installed in switchgear 100, are in contact with, and are configured to transfer heat from, the sets of run-in buses 140a and/or the sets of run-in buses 140b. In the exemplary embodiment, system 200 includes a thermally conductive plate 202 for the sets of run-in buses 140a and a thermally conductive plate 202 for the sets of run-in buses 140b. In this embodiment, each one of the thermally conductive plates 202 associated with either of the run-in buses 140a or 140b is in contact with, and transfers heat from, the respective sets of run-in buses 140a or the sets of run-in buses 140b. In other embodiments, a single thermally conductive plate 202 may be in contact with, and transfer heat from, both of the sets of run-in buses 140a and the sets of run-in buses 140b. The thermally conductive plate 202 is suitably formed of a thermally conductive material, such as, for example, aluminum.

The thermally conductive plates 202 have identical constructions and are collectively described hereafter as plate 202. Plate 202 that extends along an axis $A_2$ from a first plate end 204 to a second plate end 206. An axis $B_2$ extends substantially perpendicular to axis $A_2$ through plate 202. Plate 202 may be installed in switchgear 100 by securing first plate end 204 to first metal side post 128a and second plate end 206 to second metal side post 128b. When plate 202 is installed in switchgear 100, axis $A_2$ extends parallel to axis $A_1$ and axis $B_2$ extends parallel to axis $B_1$. Additionally, plate 202 is installed and positioned so as to intersect the respective sets of run-in buses 140a or 140b extending from busbar assembly 118 to circuit breaker compartment 120a. In the exemplary embodiment, plate 202 forms a part of interior wall 112 at the location where the respective sets of run-in buses 140a or 140b extend therethrough. The remainder of interior wall 112 may be constructed of a plurality of plastic molded slabs 148 that are each secured to the first and second metal side posts 128a,b. Plastic molded slabs 148 and plate 202 may be similarly sized and dimensioned, for example, each may have a similar height relative to axis $B_1$. Together, plastic molded slabs 148 and plate 202 facilitate a modular design of interior wall 112. In other embodiments, plate 202 may be separate from interior wall 112 and may be secured to first and second metal side posts 128a,b at another location such that plate 202 intersects the respective run-in buses 140a or 140b to enable plate 202 to function as described herein. Plate 204 has a face surface 208. In the exemplary embodiment, face surface 208 is oriented toward vent wall 124 when plate 202 is installed in switchgear 100. In other embodiments, face surface 208 may have a different orientation, for example, face surface 208 may be oriented toward busbar assembly 118 when plate 202 is installed in switchgear 100.

Figure 5:
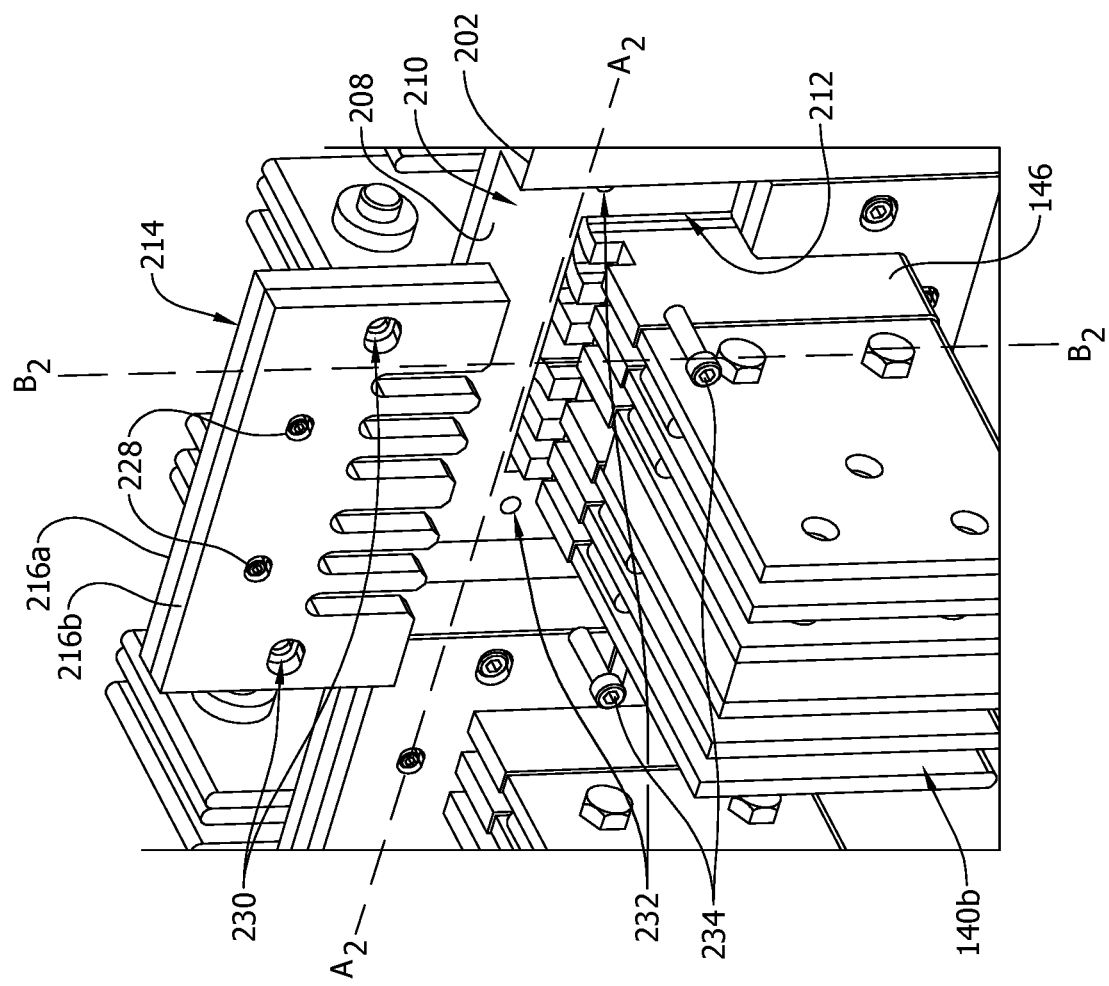
FIG. 5 is a magnified, partially exploded view of a portion of the thermally conductive plate shown in FIG. 4 having an exemplary contact assembly.
Figure 6A:
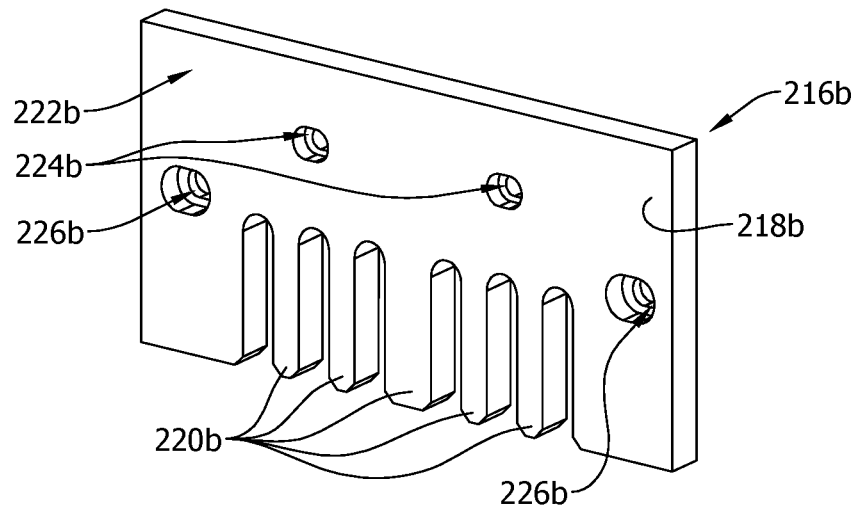
FIGS. 6A and 6B are isolated perspective and front views, respectively, of a second contact member included with the contact assembly shown in FIG. 5.
Figure 6B:
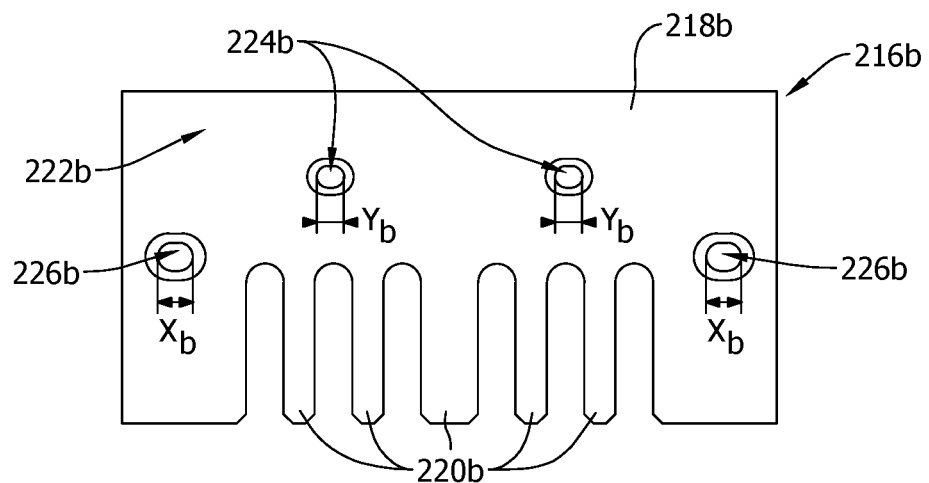
Figure 7A:
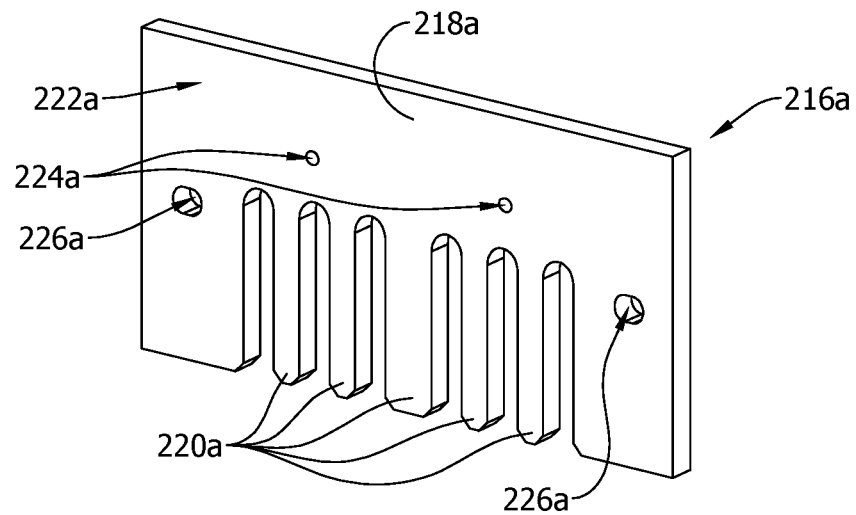
FIGS. 7A and 7B are isolated perspective and front views, respectively, of a first contact member included with the contact assembly shown in FIG. 5.
Figure 7B:
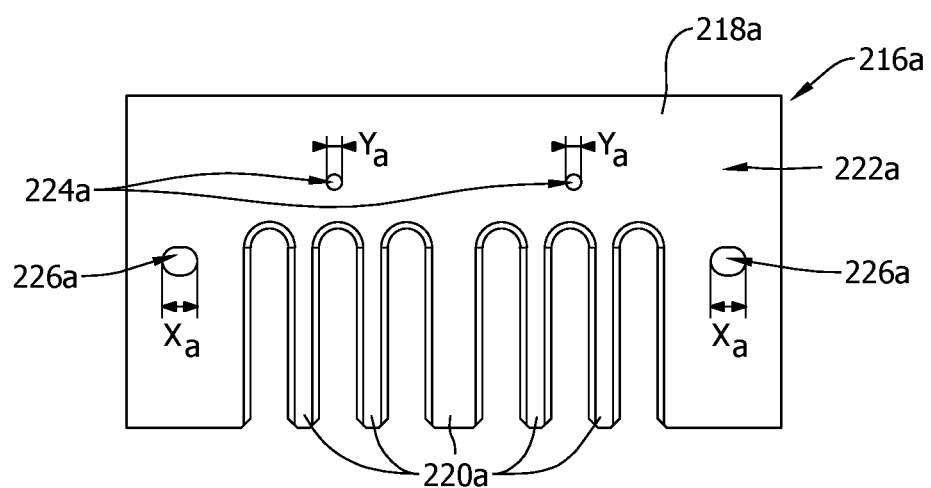

Turning to FIG. 5, the plate 202 has rectangular-shaped recessed portions 210 formed in face surface 208. Each recessed portion 210 spans an entire lateral dimension of plate 202 along axis $B_2$, and the recessed portions 210 are spaced apart from one another along the length of plate 202 along axis $A_2$. An opening 212 is formed in plate 202 at each recessed portion 210, and each opening 212 extends through plate 202 in a direction perpendicular to both axes $A_2$ and $B_2$. Plate 202 receives one of the sets of run-in buses 140a or 140b through each opening 212. The run-in buses 140a and 140b thus extend through plate 202 and, thereby, the run-in buses 140a and 140b extend through interior wall 112 into exhaust channel 126 (shown in FIG. 3). In this respect, the position and number of recessed portions 210 and the position and number of openings 212 corresponds to the position and number of sets of run-in buses 140a or 140b extending through plate 202. Accordingly, in the exemplary embodiment, plate 202 includes three recessed portions 210 and three openings 212. A portion of each of the run-in buses 140a or 140b extending through the respective opening 212 is covered by an electrically insulating material 146. Electrically insulating material 146 may include, for example, an epoxy coating, an epoxy sleeve, or a heat shrink tubing. Each opening 212 may be sized such that run-in buses 140a or 140b extend therethrough with little to no contact between plate 202 and run-in buses 140a and 140b.

System 200 also includes contact assemblies 214 that are each configured to contact one of the sets of run-in buses 140a or 140b extending through one of the openings 212 of plate 202. Suitably, both the plate 202 and contact assemblies 214 are formed of a thermally conductive material (e.g., aluminum). Contact assemblies 214 have identical construction and are collectively described hereafter as contact assembly 214. Contact assembly 214 is secured to plate 202 and is seated in a respective recessed portion 210. Contact assembly 214 includes a first contact member 216a (shown in FIGS. 7A and 7B) that secures to plate 202 and a second contact member 216b (shown in FIGS. 6A and 6B) that secures to first contact member 216a. Each of the first and second contact members 216a,b has a rectangular-shaped body 222a,b defining opposing face surfaces 218a and 218b, respectively. When assembled, one of the face surfaces 218a of first contact member 216a is oriented toward, and is in contact with, face surface 208 of plate 202 at recessed portion 210, and the other one of the face surfaces 218a is oriented toward, and is in contact with, one of the face surfaces 218b of second contact member 216b that is secured to first contact member 216a. Each contact member 216a,b has spaced apart fingers 220a,b formed in the body 222a,b. Each pair of adjacent fingers 220a and adjacent fingers 220b is separated by a slot, such that the spaced apart fingers 220a,b define a series of slots in contact member 216a,b. Each contact member 216a,b also includes apertures 224a,b and holes 226a,b formed in the body 222a,b of the respective contact member 216a,b. Each of the apertures 224a,b and holes 226a,b extends through the opposing face surfaces 218a,b of the respective contact member 216a,b.

The contact members 216a,b are similarly sized and dimensioned. Each of the apertures 224a of first contact member 216a aligns with a respective aperture 224b of second contact member 216b. Each aligning pair of apertures 224a,b receives a fastener 228 (e.g., a bolt or a screw) to secure the first and second contact members 216a,b and form contact assembly 214. When contact assembly 214 is formed, each of the holes 226a of first contact member 216a are aligned with a respective hole 226b of second contact member 216b to define holes 230 extending through contact assembly 214. Plate 202 has bores 232 (shown in FIG. 5) formed at recessed portion 210 that correspond to and align with holes 230 of contact assembly 214. Each set of aligning holes 230 and bore 232 receives a fastener 234 to secure contact assembly 214 to plate 202.

When contact assembly 214 is formed, each of the spaced apart fingers 220a of first contact member 216a aligns with a finger 220b of second contact member 216b. The aligning pairs of fingers 220a,b form spaced apart fingers 236 of contact assembly 214. Each pair of adjacent fingers 236 is separated by a slot 238, such that the spaced apart fingers 236 define a series of slots 238 in contact assembly 214. Fingers 236 partially cover opening 212 when contact assembly 214 is secured to plate 202 at recessed portion 210. Fingers 236 are sized and oriented so that slots 238 receive one of the run-in buses 140a or 140b extending through opening 212. Thereby, when the contact assembly 214 is seated in a recessed portion 210, each of the spaced apart fingers 236 is located in a space between adjacent run-in buses 140a or adjacent run-in buses 140b, and each of the run-in buses 140a,b is located in a slot 238 when the fingers 236 are located in the run-in bus spaces, so that the run-in buses 140a,b and the contact assembly fingers 236 are oriented in an interleaved pattern. Each of the fingers 236 extends along the body of a run-in bus 140a or 140b located in a slot 238 adjacent to the respective finger 236. In general, slots 238 are sized, that is, have a suitable width extending between adjacent fingers 236, so that each of the fingers 236 contacts a portion of an adjacent run-in bus 140a or 140b.

In the exemplary embodiment, two contact assemblies 214 are seated in each recessed portion 210. The contact assemblies 214 seated in each recessed portion 210 are oriented so that the fingers 236 of one of the contact assemblies 214 are oriented toward and align with the fingers 236 of the other one of the contact assemblies 214. Thereby, pairs of aligning slots 238 of the contact assemblies 214 are formed. Each of the run-in buses 140a,b is located in a space formed by a pair of aligning slots 238 when the contact assemblies 214 are seated in the recessed portions 210. Each run-in bus 140a or 140b located in a pair of aligning slots 238 has an upper portion and a lower portion. A first one of the two contact assemblies 214 seated in a respective recessed portion 210 has spaced apart fingers 236 interleaved with the upper portion of the run-in buses 140a,b located in the pair of aligning slots 238. A second one of the two contact assemblies 214 has spaced apart fingers 236 interleaved with the lower portion of the run-in buses of the run-in buses 140a,b located in the pair of aligning slots 238. Thereby, each of the run-in buses 140a,b located in a pair of aligning slots 238 may be substantially or entirely circumscribed by the adjacent fingers 236 of each of the two contact assemblies 214. In other embodiments, the aligning fingers 236 of the two contact assemblies 214 seated in each recessed portion 210 may be joined to form a single contact assembly (not shown).

The portion of each run-in bus 140a or 140b in contact with an adjacent finger 236 is covered by electrically insulating material 146. The thickness of the electrically insulating material 146 may vary. As a result, a width of slot 238 that is suitable to establish contact between each finger 236 and adjacent run-in bus 140a or 140b may vary. Contact assembly 214 enables the width of the slots 238 to be adjusted and account for variations in the thickness of electrically insulating material 146. In the exemplary embodiment, when contact assembly 214 is formed and secured to plate 202, second contact member 216b is moveable along axis $A_2$ relative to first contact member 216a and plate 202. Each of the apertures 224b and holes 226b are sized to enable movement of second contact member 216b.

More specifically, each of the apertures 224b has a width $Y_b$ that is greater than a width $Y_a$ of the apertures 224a of first contact member 216a, and each of the holes 226b has a width $X_b$ that is greater than a width $X_a$ of the holes 226a and a width (not shown) of the bores 232 of plate 202. As a result, second contact member 216b is moveable about fasteners 228 and 234 along axis $A_2$. In the exemplary embodiment, second contact member 216b is moveable along axis $A_2$ when contact assembly 214 is secured to plate 202 and first contact member 216a is fixed and not moveable along axis $A_2$. Alternatively, in other embodiments, first contact member 216a may be moveable along axis $A_2$ as described above for second contact member 216b, and second contact member 216b may be fixed and not moveable along axis $A_2$. In still other embodiments, both first contact member 216a and second contact member 216b may be movable along axis $A_2$. Recessed portion 210 in which contact assembly 214 is seated is suitably sized so that one or both of contact members 216a,b are moveable within the recessed portion 210 to enable contact assembly 214 to function as described herein.

Figure 8A:
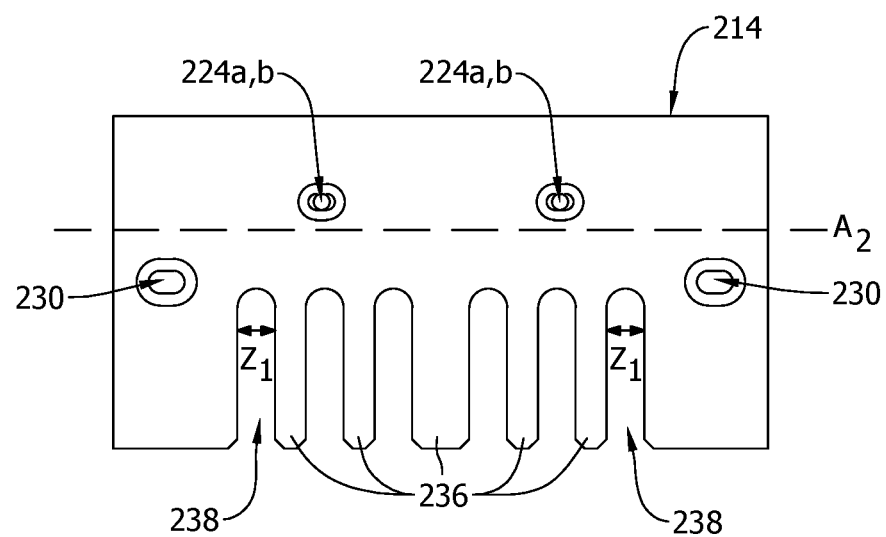
FIGS. 8A and 8B are isolated front views of the contact assembly shown in FIG. 5, in a centered positioned and a biased position, respectively.
Figure 8B:
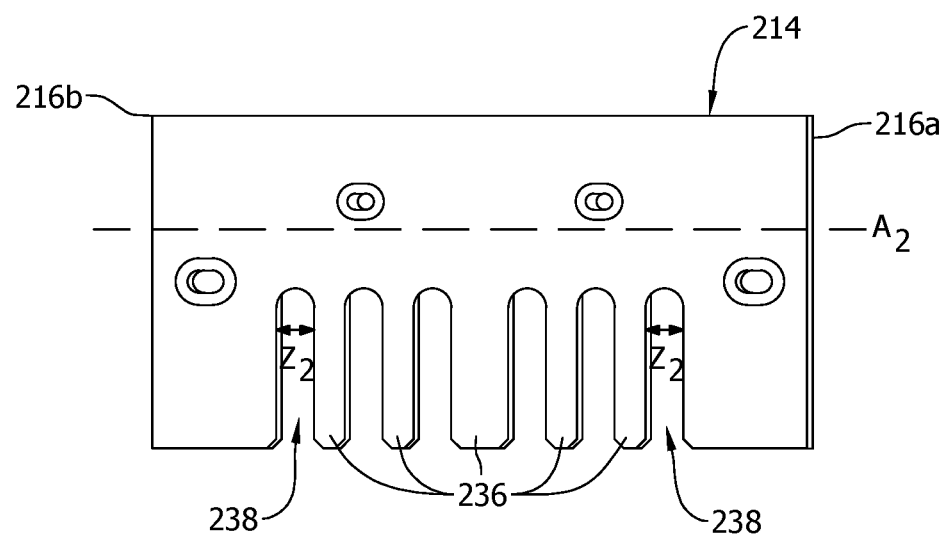

Referring to FIGS. 8A and 8B, movement of second contact member 216b along axis $A_2$ causes contact assembly 214 to adjust between a centered position (shown in FIG. 8A) and a biased position (shown in FIG. 8B). In the centered position, each of the fingers 220a of first contact member 216a align with a respective finger 220b of second contact member 216b, such that fingers 236 of contact assembly 214 define slots 238 having a width $Z_1$. In the biased position, each of the fingers 220a of first contact member 216a and the respective fingers 220b of second contact member 216b are offset or biased, such that fingers 236 of contact assembly 214 define slots 238 having a width $Z_2$. Width $Z_2$ is smaller than width $Z_1$. Starting at the centered position, contact assembly 214 may be adjusted to the biased position by moving second contact member 216b along axis $A_2$ toward first end 204 of thermally conductive plate 202, or toward second end 206 of thermally conductive plate 202, to bias the fingers 220a,b of the contact members 216a,b. Contact assembly 214 may be adjusted back to the centered position from the biased position by moving second contact member 216b along axis $A_2$ toward the other end 206 or 204, to align the fingers 220a,b of the contact members 216a,b. Adjusting contact assembly 214 between the centered position and the biased position enables selectable adjustment of the width of each of the slots 238 to suitably establish contact between each of the fingers 236 of contact assembly 214 and an adjacent run-in bus 140a or 140b, based on a thickness of electrically insulating material 146.

Referring to FIGS. 1-8, a method for transferring heat generated in switchgear 100 will now be described. As described above, busbar assembly 118 is electrically connected to circuit breaker 122 by run-in buses 140a,b that extend from first interior portion 108, through interior wall 112, to second interior portion 110. Interior wall 112 may be assembled by securing a series of plastic molded slabs 148 to metal side posts 128a,b extending along sides of cabinet body 102 of switchgear 100. In addition, the portions of interior wall 112 through which run-in buses 140a,b extend are formed by thermally conductive plates 202 each secured at first end 204 to first metal side post 128a and at second end 206 to second metal side post 128b. The contact assemblies 214 secured to thermally conductive plate 202 may be adjusted as described above so that slots 238 that each receive one of the run-in buses 140a and/or 140b have a suitable width to establish contact between each of the fingers 236 of contact assemblies 214 and the adjacent run-in bus(es) 140a and/or 140b extending through the slot(s) 238 adjacent to each finger 236. During operation, heat H is generated in the run-in buses 140a,b by conducting a current $E_1$ or $E_2$ through each of the run-in buses 140a,b.

Plates 202 and contact assemblies 214 are formed of a thermally conductive material (e.g., aluminum) and transfer heat H generated in the run-in buses 140a,b to one or both of metal side posts 128a,b. For example, the metal side posts 128a,b, which may be exposed to ambient or near-ambient temperature conditions, may act as a heat sink relative to the run-in buses 140a,b that are at a higher temperature relative to a temperature of side posts 128a,b during operation. Heat H is conducted through each of the fingers 236 of the contact assemblies 214 that are in contact with an adjacent run-in bus 140a or 140b, and through plate 202 of thermally conductive plate 202, to metal side posts 128a,b. As described above, a portion of each of the run-in buses 140a,b that is in contact with an adjacent finger 236 is covered an electrically insulating material. Thereby, heat H may be transferred from the run-in buses 140a,b to metal side posts 128a,b by thermally conductive plate 202 without also conducting electrical current $E_1$ or $E_2$ therebetween.

The above-described embodiments of systems and methods for transferring heat generated in an electrical enclosure provide technical advantages by facilitating lower temperatures in electrical components within the electrical enclosure during operation. More particularly, the embodiments described herein provide a thermally conductive plate that is selectably adjustable to establish contact with run-in buses connecting busbars and circuit breakers within the electrical enclosure and transfer heat generated in the run-in buses to cooler structural elements along or near a periphery of the electrical enclosure. This facilitates increasing an amount of heat that can be dissipated from the run-in buses, which may otherwise be at a greater risk of exceeding predetermined temperature rise limits for heat rated enclosures during operation. Moreover, the thermally conductive plate according at least some embodiments of the present disclosure is designed as a modular element of components (e.g., an interior wall) that are part of existing electrical enclosures. In this respect, existing electrical enclosures may be retrofitted with the exemplary features described herein to enable the systems and methods according to the present disclosure to be performed by and/or within existing electrical enclosures.

Accordingly, the systems and methods disclosed herein facilitate increasing a power density of switchgear, thereby enabling more current to run through the system without increasing an overall volume of the switchgear enclosure. As such, circuit breaker devices with higher current ratings, and/or a greater number of circuit breaker devices, may be installed in the switchgear system without substantial reconfiguration and/or redesign of the switchgear. Additionally, the systems and methods may facilitate decreasing copper used in the switchgear system as the conductive components are cooled more efficiently, thereby facilitating increasing product margin of the switchgear. Additionally, the systems and methods may facilitate decreasing enclosure volume of existing switchgear as the conductive components (e.g., run-in buses) are cooled more efficiently and a reduced amount of ambient air is suitable to maintain the temperatures of the conductive components within predetermined temperature rise limits.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for transferring heat generated by current-conducting electrical components in an electrical enclosure housing a busbar assembly and a circuit breaker, the system comprising:
   run-in buses configured to conduct an electrical current between the busbar assembly and the circuit breaker, each pair of adjacent run-in buses being separated by a space;
   a thermally conductive plate having at least one opening extending therethrough, wherein the plate receives the run-in buses through the at least one opening, the plate having a face surface facing the run-in buses; and
   at least one contact assembly secured to the plate, the at least one contact assembly positioned on the face surface, the at least one contact assembly having spaced apart fingers that partially cover the at least one opening of the plate, wherein adjacent fingers define a slot, each of the fingers being located in the respective space between adjacent run-in buses, and each of the run-in buses being located in the respective slot when the fingers are located in the spaces between adjacent run-in buses, and wherein the run-in buses and contact assembly fingers are oriented in an interleaved pattern.

2. The system of claim 1, wherein the plate includes an axis, and wherein the at least one contact assembly comprises a first contact member secured to the plate, and a second contact member secured to the first contact member, wherein each of the first and second contact members comprises spaced apart fingers that each align with a finger of the other contact member to form the fingers of the at least one contact assembly, wherein one of the contact members is moveable relative to the thermally conductive plate along the axis to bias the fingers of the first contact member and the fingers of the second contact member.

3. The system of claim 2, wherein one of the contact members is moveable relative to the plate along the axis such that the at least one contact assembly is adjustable between:
   a centered position wherein the fingers of the first contact member align with the fingers of the second contact member to form the fingers of the at least one contact assembly, wherein each of the slots defined by adjacent fingers of the at least one contact assembly has a first width; and
   a biased position wherein the fingers of the first contact member and the fingers of the second contact member are offset to form the fingers of the at least one contact assembly, wherein each of the slots defined by adjacent fingers of the at least one contact assembly has a second width that is smaller than the first width of the respective slot.

4. The system of claim 3, wherein the at least one contact assembly is adjustable between the centered position and the biased position such that a width of each of the slots defined by adjacent fingers of the at least one contact assembly is sized to establish contact between the adjacent fingers defining the respective slot and the run-in bus that is located in the respective slot.

5. The system of claim 2, wherein each of the contact members comprises at least one aperture that aligns with an aperture of the other contact member, wherein the aligning apertures receive a fastener to secure the contact members to form the at least one contact assembly, and wherein the at least one aperture of the one of the contact members that is moveable relative to the plate along the axis is sized to allow the one of the contact members to move relative to the other one of the contact members.

6. The system of claim 2, wherein each of the contact members comprises at least one hole that aligns with at least one hole of the other contact member, wherein the plate comprises at least one bore that aligns with the aligning holes of the contact members, wherein the aligning holes and bore receive a fastener to secure the contact members to the plate, and wherein the at least one hole of the one of the contact members that is moveable relative to the plate along the axis is sized to allow the one of the contact members to move relative to the other one of the contact members and the plate.

7. The system of claim 1, wherein the system comprises a metal side post extending along the electrical enclosure, the thermally conductive plate being secured to the metal side post at a first end of the plate, and wherein the thermally conductive plate transfers heat generated in each of the run-in buses during operation from each of the run-in buses toward the metal side post secured to the first end of the plate.

8. The system of claim 1, wherein the plate and the at least one contact assembly are each made of a thermally conductive material comprising aluminum.

9. The system of claim 1, wherein a width of each of the slots defined by adjacent fingers of the at least one contact assembly is sized to establish contact between the adjacent fingers defining the respective slot and a portion of the run-in bus that is located in the respective slot, wherein the portion of the run-in bus is covered by an electrically insulating material.

10. The system of claim 9, wherein the electrically insulating material covering the portion of the run-in bus comprises an epoxy coating, an epoxy sleeve, or a heat shrink tubing.

11. The system of claim 1, wherein the plate has at least one recessed portion, the at least one opening being formed at the at least one recessed portion, wherein the at least one contact assembly secured to the plate is seated in the at least one recessed portion.

12. The system of claim 11, wherein the run-in buses are comprised of three sets of run-in buses, wherein the plate has three recessed portions and three openings, each of the openings being formed at one of the recessed portions, wherein each set of run-in buses is received through one of the openings, and wherein at least one contact assembly is seated in each of the recessed portions.

13. The system of claim 11, wherein the run-in buses have an upper portion and a lower portion, wherein a first contact assembly and a second contact assembly are each seated in the at least one recessed portion, the first contact assembly having spaced apart fingers interleaved with the upper portion of the run-in buses, the second contact assembly having spaced apart fingers interleaved with the lower portion of the run-in buses.

14. An electrical enclosure having a first end and a second end, and opposing sides extending between the first end and the second end, the electrical enclosure comprising:
  an interior wall joining the sides of the electrical enclosure and extending between the first end and the second end, the interior wall comprising at least one thermally conductive plate, the thermally conductive plate having at least one opening extending therethrough;
  at least one contact assembly secured to the thermally conductive plate, the at least one contact assembly having spaced apart fingers that partially cover the at least one opening of the plate, wherein adjacent fingers define a slot;
  a busbar assembly positioned between the first end and the interior wall; a circuit breaker positioned between the second end and the interior wall; and
  run-in buses extending between the busbar assembly and the circuit breaker and extending through the at least one opening of the thermally conductive plate, each pair of adjacent run-in buses being separated by a space, each of the run-in buses being located in the respective slot of the at least one contact assembly, each of the spaced apart fingers of the at least one contact assembly being located in the respective space between adjacent run-in buses, wherein the run-in buses and contact assembly fingers are oriented in an interleaved pattern
  wherein the plate has a face surface facing the run-in buses, the at least one contact assembly positioned on the face surface.

15. The electrical enclosure of claim 14, further comprising a first metal side post extending along one of the sides of the electrical enclosure and a second metal side post extending along a side opposite the first side post, wherein the interior wall joins the first and second metal side posts, and wherein the thermally conductive plate transfers heat generated in each of the run-in buses during operation from each of the run-in buses toward at least one of the first and second metal side posts.

16. The electrical enclosure of claim 14, wherein the thermally conductive plate includes an axis, wherein the contact assembly comprises a first contact member secured to the plate, and a second contact member secured to the first contact member, wherein each of the first and second contact members comprises spaced apart fingers that each align with a finger of the other contact member to form the fingers of the contact assembly, wherein one of the contact members is moveable relative to the plate along the axis such that the at least one contact assembly is adjustable between:
  a centered position wherein the fingers of the first contact member align with the respective fingers of the second contact member to form the fingers of the at least one contact assembly, wherein each of the slots defined by the fingers of the at least one contact assembly has a first width; and
  a biased position wherein the fingers of the first contact member and the respective fingers of the second contact member are offset to form the fingers of the at least one contact assembly, wherein each of the slots defined by the fingers of the at least one contact assembly has a second width that is smaller than the first width of the respective slot.

17. The electrical enclosure of claim 16, wherein the plate has at least one recessed portion, the at least one opening being formed at the at least one recessed portion, wherein the at least one contact assembly is seated in the at least one recessed portion, wherein the at least one recessed portion is sized so that the one of the contact members is moveable within the recessed portion.

18. The electrical enclosure of claim 14, wherein the plate and the at least one contact assembly are each made of a thermally conductive material comprising aluminum, wherein a portion of each of the run-in buses is covered by an electrically insulating material, and wherein each of the fingers of the at least one contact assembly is in contact with the electrically insulated portion of an adjacent run-in bus.

19. A method for transferring heat generated by current-conducting electrical components in an electrical enclosure, the electrical enclosure housing a metal side post extending along a periphery of the electrical enclosure, a busbar assembly, a circuit breaker, and run-in buses extending between the busbar assembly and the circuit breaker, wherein the run-in buses are configured to conduct an electrical current, the method comprising:
  guiding each of the run-in buses through a thermally conductive plate, the thermally conductive plate configured with at least one opening configured to receive a run-in bus,
    wherein at least one contact assembly is attached to a face surface of the thermally conductive plate and configured to contact at least one of the run-in buses, the at least one contact assembly having spaced apart fingers that partially cover at the least one opening of the plate, the thermally conductive plate having a first end secured to the metal side post, wherein the thermally conductive plate is in contact with each of the run-in buses; and transferring heat generated in the run-in buses toward the metal side post using the thermally conductive plate and the at least one contact assembly, wherein the heat is generated from a current conducted through the run-in buses.

20. The method of claim 19, further comprising covering a portion of each of the run-in buses with an electrically insulating material, wherein the thermally conductive plate is in contact with the electrically insulated portion of each of the run-in buses.

\* \* \* \* \*